(12) United States Patent
Ptucha et al.

(10) Patent No.: US 9,349,131 B2
(45) Date of Patent: May 24, 2016

(54) INTERACTIVE DIGITAL ADVERTISING SYSTEM

(75) Inventors: Raymond William Ptucha, Honeoye Falls, NY (US); Kevin Edward Spaulding, Spencerport, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 13/364,417

(22) Filed: Feb. 2, 2012

(65) Prior Publication Data

US 2013/0204707 A1  Aug. 8, 2013

(51) Int. Cl.
*G06Q 30/02* (2012.01)

(52) U.S. Cl.
CPC ............ *G06Q 30/02* (2013.01); *G06Q 30/0269* (2013.01); *G06Q 30/0271* (2013.01)

(58) Field of Classification Search
CPC ............. H04N 5/2723; G01C 21/3697; G09F 2013/00; G09F 2019/00; G09F 2027/00; G09F 2027/001; G09F 2027/002
See application file for complete search history.

(56) References Cited

U.S. PATENT DOCUMENTS

| | | | |
|---|---|---|---|
| 5,563,988 A | 10/1996 | Maes et al. | |
| 8,723,790 B1 * | 5/2014 | Schaefer | G06F 3/011 345/156 |
| 8,810,513 B2 * | 8/2014 | Ptucha | G06F 3/017 345/158 |
| 2008/0109397 A1 * | 5/2008 | Sharma et al. | 707/1 |
| 2008/0262911 A1 * | 10/2008 | Altberg et al. | 705/14 |
| 2009/0077504 A1 * | 3/2009 | Bell et al. | 715/863 |
| 2011/0007079 A1 * | 1/2011 | Perez et al. | 345/473 |
| 2011/0080341 A1 * | 4/2011 | Helmes et al. | 345/163 |
| 2011/0154266 A1 * | 6/2011 | Friend et al. | 715/863 |
| 2011/0157009 A1 | 6/2011 | Kim et al. | |
| 2011/0197263 A1 | 8/2011 | Stinson, III | |
| 2011/0223990 A1 * | 9/2011 | Burke et al. | 463/25 |
| 2011/0231873 A1 * | 9/2011 | Toebes et al. | 725/35 |
| 2012/0030006 A1 * | 2/2012 | Yoder et al. | 705/14.41 |
| 2012/0268372 A1 * | 10/2012 | Park et al. | 345/158 |
| 2013/0143651 A1 * | 6/2013 | Harrison et al. | 463/31 |

OTHER PUBLICATIONS

Digital Place-Based Media; Jose Avalos; Apr. 2010.*
Afzal et al., "Intentional affect: an alternative notion of affective interaction with a machine," Proc. 23rd British HCI Group Annual Conference on People and Computers: Celebrating People and Technology, pp. 370-374 (2009).

(Continued)

*Primary Examiner* — Peter Choi
*Assistant Examiner* — Deirdre Hatcher
(74) *Attorney, Agent, or Firm* — Hogan Lovells US LLP (57) ABSTRACT

A interactive digital advertising system including a soft-copy display including at least an information display region and a command control region, a digital image capture system positioned to capture a time sequence of images of users located in a field-of-view of the soft-copy display, and a storage memory storing a library of advertisements. A time sequence of images is analyzed to detect a plurality of users, and at least one of the users is designated to be a controlling user. The captured images are displayed in the command control region, wherein the detected users are demarked using graphical elements. The captured time sequence of images is analyzed to determine one or more demographic attributes relating to the designated controlling user, and a particular advertisement from the library of advertisements is selected and displayed in the information display region responsive to the determined demographic information.

24 Claims, 6 Drawing Sheets

(56) References Cited

OTHER PUBLICATIONS

Lew et al., "Human-computer intelligent interaction: A survey," 4th IEEE International Workshop on Human-Computer Interaction, pp. 1-5 (2007).

Shotton, et al., "Real-time human pose recognition in parts from single depth images," Computer Vision and Pattern Recognition, pp. 1297-1304, (2011).

Suma et al., "FAAST: The Flexible Action and Articulated Skeleton Toolkit," Proc. IEEE Virtual Reality Conference, pp. 247-248 (2011).

Kaplan, "Are gesture-based interfaces the future of human computer interaction?" Proc. International Conference on Multimodal Interfaces, pp. 239-240 (2009).

Schneiderman, "Feature-centric evaluation for efficient cascaded object detection," Computer Vision and Pattern Recognition, vol. 2, pp. II-29-II-36 (2004).

DeMenthon et al., "Model Based Pose in 25 Lines of Code," International Journal of Computer Vision, vol. 15, pp. 123-141 (1995).

Cootes et al., "Active shape models—their training and application," Computer Vision and Image Understanding, vol. 61, pp. 38-59 (1995).

Ptucha et al., "Facial Pose Estimation Using a Symmetrical Feature Model," Proc. IEEE International Conference on Multimedia and Expo, pp. 1664-1667 (2009).

\* cited by examiner

INTERACTIVE DIGITAL ADVERTISING SYSTEM

CROSS-REFERENCE TO RELATED APPLICATIONS

Reference is made to commonly assigned, U.S. patent application Ser. No. 13/364,391, now patented as U.S. Pat. No. 8,723,796, issued May 13, 2014, entitled: "Multi-user interactive display system", by Ptucha et al.; and to commonly-assigned, commonly assigned U.S. patent application Ser. No. 13/364,409, now patented as U.S. Pat. No. 8,810,513, issued Aug. 19, 2014, entitled: "Method for controlling interactive display system", by Ptucha et al., each of which is incorporated herein by reference.

FIELD OF THE INVENTION

This invention pertains to the field of digital imaging systems and more particularly to a method for interactively controlling advertizing content displayed on a soft copy display.

BACKGROUND OF THE INVENTION

There has been much research on improving the overall experience of human-computer interaction. Multi-modal affective computing, or the automatic extraction of human emotion using multiple input modalities, is a field that is revolutionizing human computer interfaces (for example, see Afzal et al., "Intentional affect: an alternative notion of affective interaction with a machine," Proc. 23rd British HCI Group Annual Conference on People and Computers: Celebrating People and Technology, pp. 370-374, 2009). In an article entitled "Human-computer intelligent interaction: A survey" (4th IEEE International Workshop on Human-Computer Interaction, pp. 1-5, 2007), Lew et al. argue that in order to achieve effective human-to-computer communication, as the human interacts with the computer, the computer also needs to interact with the human. The goal of human-computer interaction is twofold: to have the computer engage and embrace all the human subtleties, that as a whole, convey the true underlying message; and to interact with the human in his/her natural setting, eliminating ambiguous or awkward input modalities.

Computers are becoming ubiquitous and are increasingly diffusing into our environment, moving from primarily foreground devices requiring purposeful user interactions (e.g., using a mouse or a keyboard) to invisible background devices. Next generation computing devices will need to increasingly interact with humans in a way that is very similar to human-to-human communication.

With the introduction of low-cost depth cameras, such as those associated with the Kinect game console available for the Xbox 360 gaming system from Microsoft Corporation of Redmond, Wash., depth estimation has become a viable option for widespread use. Depth information provides much more salient information than RGB or grayscale cameras for subject gesture recognition. The extraction of objects against complex backgrounds, and the tracking of these objects has been reduced from a highly compute-intensive, error-prone task to one that is much more robust and works with much simpler methods, spurring a revolutionary leap in machine understanding (see Shotton, et al., "Real-time human pose recognition in parts from single depth images," Computer Vision and Pattern Recognition, pp. 1297-1304, 2011).

Gesture recognition using depth cameras is now able to recognize an increasingly sophisticated dictionary of commands. Examples of gesture recognition methods are described by Suma et al. in the article "FAAST: The Flexible Action and Articulated Skeleton Toolkit" (Proc. IEEE Virtual Reality Conference, pp. 247-248, 2011; and by Kaplan in the article "Are gesture-based interfaces the future of human computer interaction?" (Proc. International Conference on Multimodal Interfaces, pp. 239-240, 2009). The rapid development of numerous gesture control platforms has resulted in a plethora of application-specific, gesture-based commands. These commands have been driven by the gaming and home entertainment markets, which generally have one or two users in constrained settings.

U.S. Patent Application Publication No. 2009/0077504 to Bell et al., entitled "Processing of gesture-based user interactions," discloses methods for extracting hand gestures for interactive displays, as well as inclusion of visible indicators on a screen, much like a mouse fiducial is used in modern day computers.

U.S. Patent Application Publication 2011/0157009 to Kim et al., entitled "Display device and control method thereof," discloses a method for using human gestures to control a device. The method is based upon human silhouette or skeletal joint estimation of the human operator.

U.S. Patent Application Publication 2011/0197263 to Stinson, entitled "Systems and methods for providing a spatial-input-based multi-user shared display experience," discloses a method for allowing multiple human users to control a device using gesture control. The method primarily uses hand gestures for living room TV control allowing split screen and multi-window displays, whereby each user controls each window.

U.S. Pat. No. 5,563,988 to Maes et al., entitled "Method and system for facilitating wireless, full-body, real-time user interaction with a digitally represented visual environment," discloses a method for allowing a human user to insert oneself into a virtual reality environment. The method allows for interaction with the environment and objects within it, including the extraction of information.

As interactive devices become more ubiquitous, gesture commands which are instinctive and intuitive for humans to perform in unconstrained settings will need to be introduced. Additionally, intuitive ways for the computer to communicate back to the user will also be needed.

SUMMARY OF THE INVENTION

The present invention represents an interactive digital advertising system, comprising:
   a soft-copy display including at least an information display region and a command control region;
   a digital image capture system positioned to capture a time sequence images of users located in a field-of-view of the soft-copy display;
   a data processing system;
   a storage memory storing a library of advertisements; and
   a program memory communicatively connected to the data processing system and storing instructions configured to cause the data processing system to implement a method for interactively controlling content displayed in the information display region, wherein the method includes:
      analyzing the captured time sequence of images to detect a plurality of users in the field-of-view of the soft-copy display who are viewing the soft copy display;
      designating at least one of the detected plurality of users to be a controlling user;

displaying the captured time sequence of images in the command control, wherein the detected users are demarked using graphical elements, and wherein the graphical element associated with the at least one controlling user is differentiated from the graphical elements associated with the other detected users to provide an indication of which of the plurality of users is the controlling user;

analyzing the captured time sequence of images to determine one or more demographic attributes relating to the at least one designated controlling user;

selecting a particular advertisement from the library of advertisements responsive to the determined demographic information; and displaying the selected advertisement in the information display region.

This invention has the advantage that the interactive digital advertising system is enabled to provide customized advertizing content responsive to demographic attributes of the controlling users.

It has the additional advantage that the digital advertising system can communicate information to the users regarding which user is the controlling user who is controlling the device at any point in time. Optionally, information about a priority order of the other detected users can also be provided.

It has the further advantage that the controlling user can control the digital advertising system using to a plurality of predefined gestures. The predefined gestures can include relinquish control gesture enabling the controlling user to relinquish control to another user, and a control request gesture that enables a non-controlling user request that they be moved to a higher position in the priority queue.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
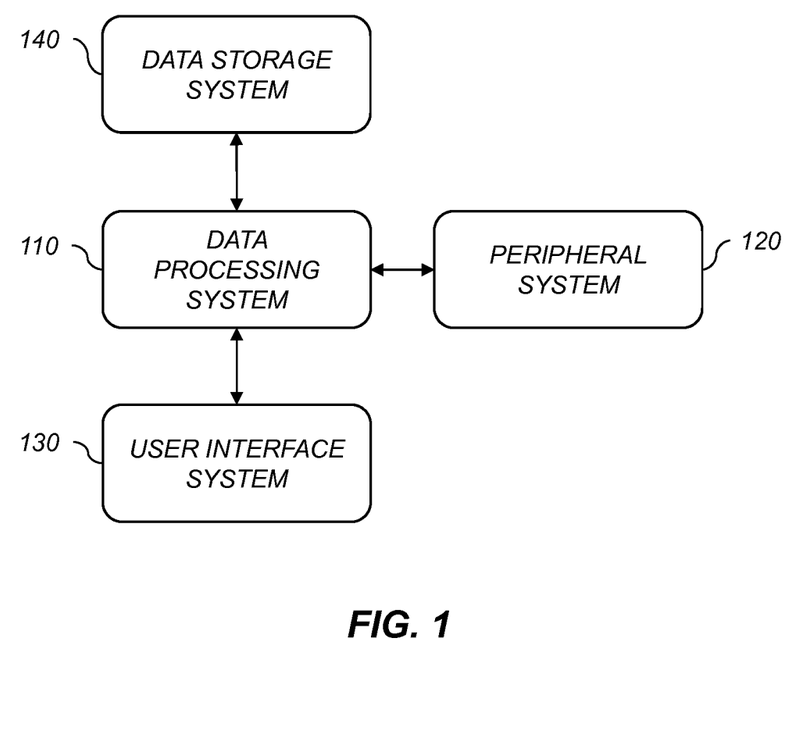
FIG. 1 is a high-level diagram showing the components of a system for gesture-based human computer interaction according to an embodiment of the present invention.

FIG. 1 is a high-level diagram showing the components of a system for gesture-based human computer interaction according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including program memory storing instructions for causing the data processing system 110 to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
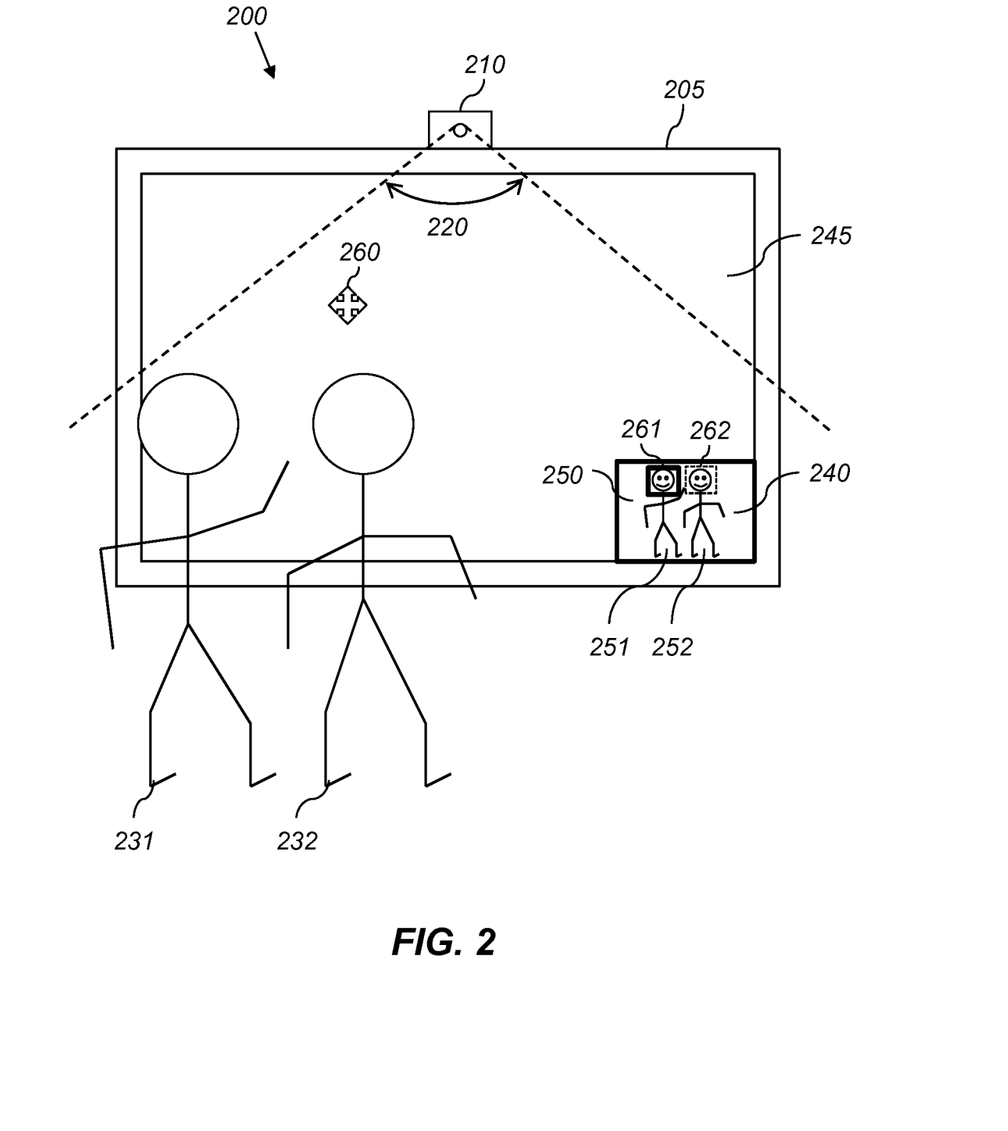
FIG. 2 is diagram showing the components of a multi-user interactive display system according to an embodiment of the present invention.

The present invention will now be described with reference to FIGS. 2 and 3. FIG. 2 shows an example of an interactive display system 200 according to an embodiment of the present invention in which users 231 and 232 interact and control the content of a soft-copy digital display 205 using body gestures, facial gestures, and head pose. In some embodiments, the content displayed on the digital display 205 can also be automatically changed based upon the number of users or associated attributes of the users, where attributes can include, for example, distance from display, gender, weight, height, hair color, hair style, facial hair type, complexion type, eye glasses type, clothing type and jewelry type. The interactive display system 200 includes at least one digital camera 210 having a corresponding field of view 220. The digital display 205 includes an information display region 245 where various types of information can be displayed, such as text, graphics or images (still or video), as well as a command control region 240.

In a preferred embodiment, a live video display showing a time sequence of images 250 captured by the digital camera 210 of the field of view 220 is displayed in the command control region 240 that occupies a portion of the digital display 205. The image 250 includes representations of users 231 and 232 (user images 251 and 252) when the users 231 and 232 are within the field of view 220 of the digital camera 210.

In a preferred embodiment, the image 250 is mirrored left-right relative to the captured video so that the left-right orientation of the users 231 and 232 is the same as the left-right orientation of the user images 251 and 252 (i.e., the left-most user 231 is shown as the left-most user image 251). It has been found that this generally provides a more intuitive user experience. In other embodiments, the left-right mirroring step may be omitted.

In a preferred embodiment the users 231 and 232 use gestures to control a visible fiducial 260 provided on the digital display 205, much like a user can use a mouse to control a cursor on a computer display. As will be discussed in more detail later, one of the users 231 and 232 is generally designated to be a controlling user. Graphical elements are preferably included on the image 250 displayed in the command control region 240. Various attributes of the graphical elements can be used to indicate which of the users 231 and 232 is the controlling user. In the example of FIG. 2, user 231 is the controlling user as reflected by the controlling user graphical element 261. The user 232 is designated to be a secondary user as reflected by the secondary user graphical element 262. In this example, the controlling user graphical element 261 is a square bounding box having a bold solid outline enclosing the face of the controlling user 231, and the secondary user graphical element 262 is a square bounding box having a finer dashed outline. In some embodiments the controlling user can be indicated using adjusting other attributes of the graphical elements such as color or transparency.

In other embodiments, the graphical elements can use other types of geometrical shapes to enclose the face of the user, or can take other forms such as avatars. For example, avatars can be placed in proximity to the detected users, or avatar heads can be overlaid on the heads of the detected users. The avatars can be photographic images of real people (e.g., models or celebrities), animals or objects, or can be graphical representations of people (e.g., caricatures), animals (e.g., cartoon characters) or objects (e.g., icons). In some embodiments, avatars can be provided having a relationship to the venue where the interactive display system 200 (FIG. 2) is used. For example, if the interactive display system 200 is used in a theme park, then avatars corresponding to cartoon characters associated with the theme park can be used.

In some embodiments, attributes of the avatars can be adjusted according to attributes of the detected users. Example of attributes of the detected users would include facial expression, facial orientation, visual focus of attention, age, gender, race, hair color, hair style, facial hair, complexion height, weight, eye glasses, clothing or jewelry. Another attribute of the detected users that can be sensed is the presence of an identifying object such as an ID card, a name badge, a wireless ID tag or a uniform type/marking. In some implementations, one or more attributes of the avatars can be adjusted to match corresponding attributes of the detected users. For example, the gender, race and hair color of the avatar can be chosen to match the detected user, or the facial expression of avatar can be adjusted to reflect the facial expression of the detected user.

When there are more than two users, attributes of the corresponding graphical elements can optionally be used to reflect a priority ordering of the users to communicate a relative position of the users in a priority queue. The priority queue indicates an order that the users will be considered to be selected as the next controlling user. In some embodiments, variations in the color, shape, size or transparency of the graphical elements can be used to provide an indication of the user's relative position in the priority queue. For example, the controlling user can be indicated using a green outline, and the rest of the users can be indicated using outlines that vary from yellow for the next user in the priority queue to red for the last user in the priority queue. In some embodiments, the graphical elements can include numerical values that provide the indication of the relative position of the users within the priority queue. For example, a "1" can be included in the graphical element for the first user in the priority queue, a "2" can be included in the graphical element for the second user in the priority queue, and so forth.

In some embodiments, more than one controlling user can be designated, where each of the controlling users can be controlling different aspects of the information displayed in the information display region 245. In such cases, it is generally desirable that some aspect of the graphical elements provide an indication of which aspects each controlling user is controlling. For example, the color of the fiducial 260 can match the color of the controlling user graphical element 261 for the corresponding controlling user. Alternately the association between the fiducial 260 and the controlling user graphical element 261 can be reflected using some other attribute such as shape, size or pattern. For example, an avatar can be associated with each of the controlling users, and the avatar can be used for both the controlling user graphical element 261 and the corresponding fiducial 260.

Figure 3:
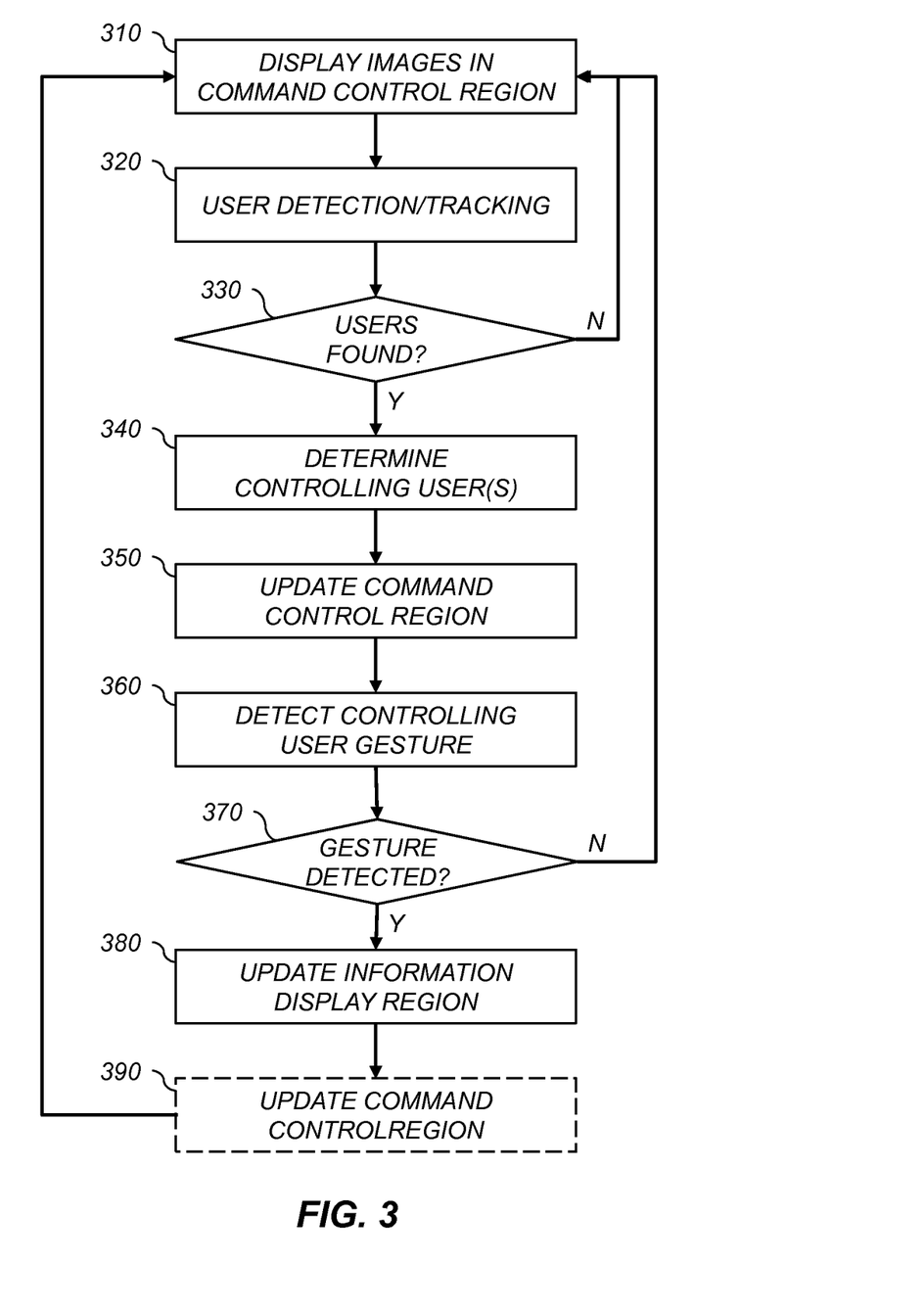
FIG. 3 is a flowchart of a method for controlling an interactive display system using gestures in accordance with the present invention.

FIG. 3 shows a flowchart of a method for controlling the interactive display system 200 (FIG. 2) in accordance with the present invention. A display image in command control region step 310 continuously displays images from a video feed (i.e., a time sequence of images) captured by the digital camera 210 (FIG. 2) to the command control region 240 (FIG. 2).

A user detection/tracking step 320 is used to detect users in the images captured by the digital camera 210. In a preferred embodiment, the user detection/tracking step 320 detects the users by performing face detection on the current captured image. In some embodiments, the interactive display system 200 can include an optional "depth camera" (not shown in FIG. 2) that can be used to determine a depth map of distances between the camera and objects in the scene. In this case, the user detection/tracking step 320 can detect users by analyzing image data captured by the depth camera to detect the presence of human silhouettes. The user detection/tracking step 320 can optionally combine the results of multiple user detection methods (e.g., face detection and depth map analysis) to provide more accurate detection results. In some embodiments, the user detection/tracking step 320 can track detected users from one frame of the captured time sequence of images to the next frame. This can increase the reliability and speed of the user detection process.

A users found test 330 is used to evaluate the results of the user detection/tracking step 320 to determine whether any users were detected in the captured images. If no users were detected, the system returns to the display images in command control region step 310. If users were detected, the interactive display system 200 initiates a human-to-computer interaction process.

A determine controlling user(s) step 340 evaluates the detected users and designates at least one user to be a controlling user. In a preferred embodiment, the determine controlling user(s) step 340 determines a priority order for each of the detected users in the field of view 220 (FIG. 2) of the digital camera 210 (FIG. 2) and keeps track of the priority order in a priority queue. The highest priority user is then designated to be a controlling user. The priority order (and therefore the relative position in the priority queue) indicates an order that the users will be considered to be selected as the controlling user. In some embodiments, more than one of the highest priority users can be designated to be a controlling user to allow for multiple users to interact simultaneously with the interactive display system 200 (FIG. 2).

The determine controlling user(s) step 340 can determine the priority order for the users in various ways. In a preferred embodiment, the priority order is determined responsive to a distance of the user from the digital display 205 and a duration of time that the user has been viewing the digital display 205. For example, a priority value $P_i$ can be determined for the $i^{th}$ user (where $i \in 1 \ldots N$, and N is the number of detected users) by performing a weighted sum involving the distance $d_i$ of the user from the digital display 205 and the time $t_i$ that the user has been viewing the digital display 205:

$$P_i = W_D\left(1 - \frac{d_i}{d_m}\right) + W_T\left(\frac{t_i}{t_m}\right) \qquad (1)$$
$$= W_D(1 - D_i) + W_T T_i$$

where $W_D$ and $W_T$ are weighting constants, $d_m = \max(d_i)$ and $t_m = \max(t_i)$ are the maximum distance and time across all of the currently detected users, respectively, and $D_i = d_i/d_m$ and $T_i = t_i/t_m$, are normalized distances and times, respectively. The values of the normalized distances and times will be in the range from 0 to 1, thereby effectively normalizes the priority values so that they will have similar magnitudes independent of the arrangement of the users. The priority values determined using Eq. (1) will be larger for users that have been standing in front of the display for longer times relative to users that just arrived, and for users that are standing closer relative to those that are further away. As users come and go, the priority values adjust themselves in a natural fashion, strikingly similar to what a group of humans would do if they were waiting for a chance to talk to a single person.

In some embodiments, the distance $d_i$ is determined by using a depth camera as described earlier. In other embodiments, the distance $d_i$ can be estimated by determining the size of the user's head and assuming that the size of the head will be inversely related to the distance between the user and the digital display 205. The time $t_i$ can be determined by tracking the user from frame-to-frame in the time sequence of images and keeping track of how many frames that the user has been in the field of view 220 (FIG. 2). Once the priority values $P_i$ are determined for each user, they can be sorted to determine the priority order of the users.

Generally the user having the highest priority value $P_i$ (and therefore the highest priority in the priority order) is designated to be the controlling user. However, to avoid frequent changes in the identity of the controlling user due to small changes in the relative position of the users, it can be desirable to give higher priority to the user who is currently designated to be the controlling user. One mechanism for providing this functionality is to incorporate an additional term into the computation of the priority value that provides additional weight for any users that are currently designated to be controlling users:

$$P_i = W_D\left(1 - \frac{D_i}{D_m}\right) + W_T\left(\frac{T_i}{T_m}\right) + W_C C_i \qquad (2)$$

where $C_i$ is a Boolean value which is "1" for users who are currently designated to be controlling users and "0" for users who are currently designated to be non-controlling users, and $W_C$ is a weighting constant.

An update command control region step 350 updates the information displayed in the command control region 240 (FIG. 2) to provide a visual indication of the identity of the controlling user(s) and the position of each of the detected users in the priority queue. As was discussed with reference to FIG. 2, in some embodiments this feature is provided by controlling one or more attributes (e.g., color) of graphical elements (e.g. bounding boxes enclosing the faces of the users) that are displayed for each user. In this way, it is readily apparent to all users who is in control and what is the position of each user within the priority queue.

After the controlling user(s) are designated, a detect controlling user gesture step 360 analyzes the time sequence of captured images to detect any gestures made be the controlling user(s) corresponding to one of a predefined set of standardized gestures. The detection of the gestures enable the controlling users to interact with the interactive display system 200 (FIG. 2), much like a user can interact with a conventional computer using input devices such as a mouse. The detected gestures can include a combination of body gestures, facial expression gestures, and facial pose gestures. Examples of types of gestures would include a pointing gesture that enables a user to control a pointing location on the digital display 205 (FIG. 2), a selection gesture that enables selection of a selectable active user interface element on the digital display 205, a movement gesture that enables movement of items on the digital display 205, a relinquish control gesture that enables the controlling user to relinquish control to the next user in the priority queue, and a control request gesture that enables a non-controlling user to request that he/she be moved to a higher position in the priority queue.

For example, in an interactive window shopping display system application, a controlling user may use a pointing gesture to point to a pair of jeans shown in the information display region 245 (FIG. 2) of the digital display 205 (FIG. 2). The controlling user can then use a selection gesture to select the pair of jeans, thereby causing the interactive display system 200 (FIG. 2) to display information about the pair of jeans (e.g., price, store inventory, or designer) in the information display region 245. As an alternate example in an interactive airport display system application, a controlling user may select content displayed in the information display region 245 to request more information on an airline, flight, destination site, or weather conditions.

A gesture detected test 370 is used to determine whether the detect controlling user gesture step 360 detected a gesture. If no gesture was detected, the process returns back to the display images in command control region step 310 to continue the process of monitoring the sequence of captured images to detect gestures made by controlling users.

In response to detecting a gesture made by the controlling user in the detect controlling user gesture step 360, the information display region 245 (FIG. 2) is updated accordingly using an update information display region step 380. For example, the information display region 245 can include a selectable active element (e.g., a "buttons" or a "link") having an associated predefined action (e.g., to display information about a selected product). If the user performs a pointing action to point to the selectable active element and a selecting gesture to select the selectable active element, the predefined action is initiated and the information display region 245 (FIG. 2) is updated accordingly (e.g., by displaying the information about the selected product). Optionally, an update command control region step 390 can also be used to update the content displayed in the command control region 240 (FIG. 2). For example, a text message may be displayed to provide visual feedback indicating what command is being executed.

After performing any appropriate actions in response to any detected gesture made by the controlling user, the process returns back to the display images in command control region step 310 to continue the process of monitoring the sequence of captured images to detect any additional gestures made by controlling users.

Various aspects of the process shown in FIG. 3 will now be discussed in more detail. In accordance with some embodiments of the present invention, the user detection/tracking step 320 determines the size and location of each face in the images in the captured video sequence. This can be accomplished using any method known in the art, such as that described by Viola et al. in the article "Rapid object detection using a boosted cascade of simple features" (Computer Vision and Pattern Recognition, Vol. 1, pp. I-511-I-518, 2001), which is incorporated herein by reference. This approach utilizes a training set of positive face and negative non-face images. Simple Haar-like wavelet weak classifier features are computed for the positive and negative training images. While no single Haar-like feature is sufficient to classify a region as face or non-face, groupings of many features form a strong classifier that can be used to determine whether or not a test region is a face. Windows of different sizes are slid across the image in order to detect faces at different locations and sizes. Because this detection process can be quite compute intensive, optimizations such as an integral image and cascades of weak classifiers can be used to make the algorithm work faster. These algorithms have been further optimized such that they can find all faces of varying pose in real time. In other embodiments, faces in an image can be detected using the method described by Schneiderman in the article "Feature-centric evaluation for efficient cascaded object detection" (Computer Vision and Pattern Recognition, Vol. 2, pp. II-29-II-36, 2004).

Once a face is found, neural networks, support vector machines, or similar classifying means can be trained to locate specific features such as the eyes, nose, and mouth. Related features such as the corners of eyes, eye brows, chin, and edge of cheeks can then be found using geometric rules based upon anthropometric constraints, such as those described by DeMenthon et al. in the article "Model Based Pose in 25 Lines of Code" (International Journal of Computer Vision, Vol. 15, pp. 123-141, 1995), which is incorporated herein by reference.

Active shape models as described by Cootes et al. in the article "Active shape models—their training and application" (Computer Vision and Image Understanding, vol. 61, pp. 38-59, 1995), which is incorporated herein by reference, can be used to identify facial features such as eyes, nose, lips, face outline, and eyebrows. The identified facial features can be analyzed to determine various attributes associated with the user, such as facial size, race, hair color, hair style, facial hair type (e.g., full beard, goatee, mustache or none), eye glasses attributes, clothing attributes, height attributes, weight attributes, complexion attributes, jewelry attributes, makeup attributes, and whether the user's eyes and mouth are open. The identified facial attributes can also be analyzed to infer other types of information associated with the user such as the user's age, gender, height, weight, facial expression (e.g., happy, sad, scared, serious, or neutral), facial orientation, visual focus of attention. In some embodiments, facial recognition algorithms can be used to analyze the facial features to determine the user's identity.

Facial pose attributes for the detected faces can be determined from extracted facial features using any method known in the art. For example, Ptucha et al., in an article entitled "Facial Pose Estimation Using a Symmetrical Feature Model", Proc. IEEE International Conference on Multimedia and Expo, pp. 1664-1667, 2009), which is incorporated herein by reference, describe a method for determining a facial pose using a geometric model that adheres to anthropometric constraints.

The determined user attributes can be used in a variety of ways. For example, as discussed earlier the user attributes can be used to adjust attributes of avatars associated with the users.

In some embodiments, the content displayed in the information display region 245 (FIG. 2) can be adjusted responsive to the determined user attributes. For example, if the controlling user is a female estimated to be in her twenties, advertising for clothing products can be displayed which would be likely to be of interest to a person fitting that demographic. Demographic information that is considered can include any attribute of the user including an age attribute, a gender attribute, a race attribute, a hair color attribute, a facial hair attribute, an eye glasses attribute, a clothing attribute, a complexion attribute, a jewelry attribute, a height attribute or a weight attribute.

In some embodiments, the determined user attributes can be used by the determine controlling user(s) step 340 during the determination of the priority order for the detected users. For example, a facial size attribute can be used to estimate the distance of the user from the digital display 205 (FIG. 2). Higher priority can be assigned to users that are closer to the digital display 205 than to users that are farther away. Similarly, facial orientation or visual focus of attention attributes can be evaluated to assign a higher priority to users that are looking directly at the digital display 205. In some embodiments where a facial recognition process is used, higher priority can be assigned to recognized users than to unknown users.

Figure 4:
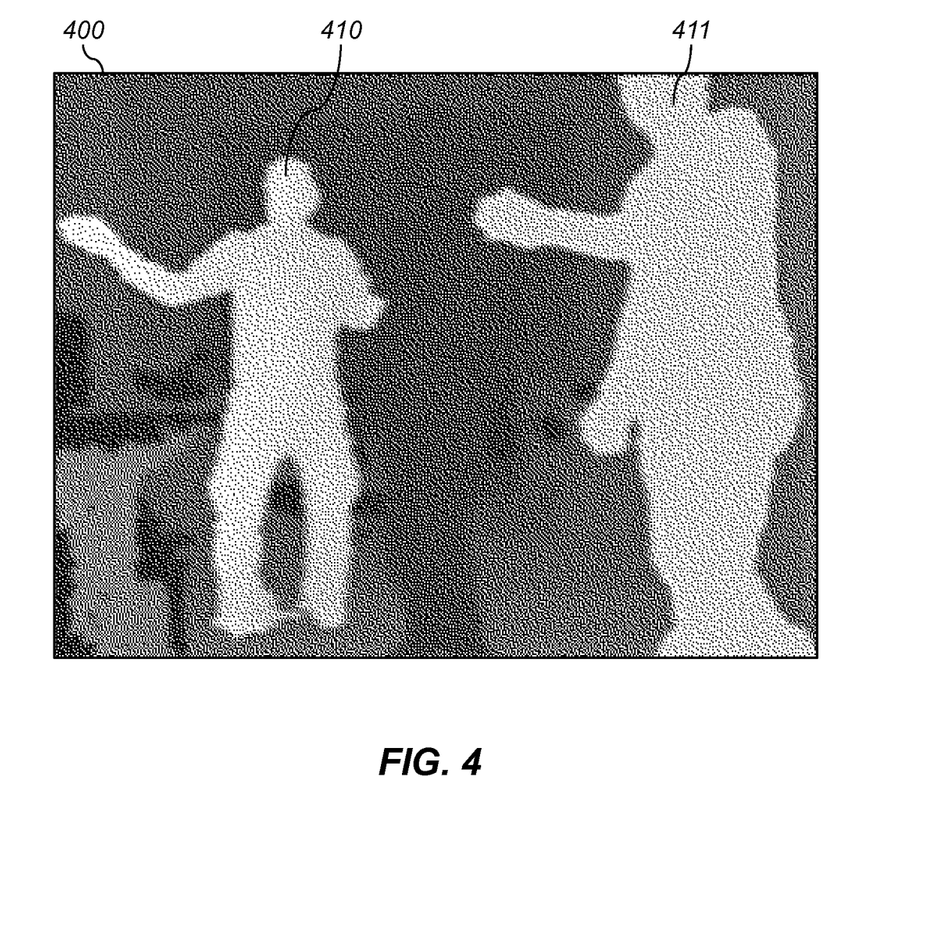
FIG. 4 shows an example of a depth image captured using a depth camera.

As mentioned earlier, in some embodiments the user detection/tracking step 320 can use depth information during the process of detecting and tracing the users. The use of depth sensors, such as the depth camera associated with Microsoft's Kinect game console, enables multiple deformable objects to be robustly tracked regardless of pose. For example, FIG. 4 shows the depth image 400 captured by a depth camera showing two users 410 and 411 interacting with an interactive display system 200 (FIG. 2). The pixel values in the depth image 400 provide an estimate of the depth (i.e., the distance from the digital display 205 to the scene, where lighter pixels correspond to objects that are closer and darker pixels correspond to objects that are farther away. In a preferred embodiment, only moving objects are considered to be candidate users. Objects that are moving against the static background can be extracted from the depth image 400 using conventional computer vision algorithms such as temporal thresholding. Initially, any contiguous moving object is considered as a candidate user. In addition to valid users, the moving objects could also include other types of objects such as cats, dogs or moving cars. The detected moving objects are passed on to a human skeletonization estimator to determine whether the object is a human. If the object is determined to be a human, it is tracked until it leaves the field of view 220 of the digital camera 210, otherwise it is ignored.

An example of a human skeletonization estimator that can be used in accordance with the present invention is described in the aforementioned article "Real-Time Human Pose Recognition in Parts from Single Depth Images," by J. Shotton, et al. According to this method, each section of the silhouette of an object is analyzed to determine whether it corresponds to a human body part, where kinematic and temporal constraints ensure plausible limb identification. The first step is to assign each pixel in the silhouette map to one of thirty-one predefined body parts. To increase saliency, the silhouette map is converted to a depth delta map, where the difference in depth between each pixel and all its neighbors is used as a classification feature. The classification engine is a training forest of decision trees, each trained with over one-million manually labeled ground truth samples. Each decision tree is pruned to a depth of twenty. After each pixel in the silhouette is classified independently by the decision forest, voting classifies each pixel to one of the thirty-one body parts. If the object is determined to be a human user, a skeletal model is then fit to localize the ankles, knees, hips, shoulders, elbows, wrist, head and torso. A local mode-finding approach based on mean shift with a weighted Gaussian kernel is used to determine the skeletal joint positions. The resulting output is a joint 3D skeletal tracking map in real-time.

Tracked faces from a conventional digital camera providing RGB images are preferably associated with tracked skeletonization from the depth camera. Together, the RGB pixel information and 3D skeletonization joint positions are used by the detect controlling user gesture step 360. The 3D locations of the skeletal joints can be used for recognizing gestures associated with moving body parts (e.g., arm motions and hand motions). The pixels from the RGB camera are primarily used to analyze the facial information. As described earlier, the facial information can be useful for the determine controlling user(s) step 340. The facial information can also be analyzed to detect certain types of gestures such as head nod gestures or eye movement gestures.

In accordance with embodiments of the present invention, nonverbal gestures are used in place of, or in addition to, voice commands. The use of nonverbal gestures have an advantage over voice commands in many applications because the detection of verbal commands in crowded or busy environment can be unreliable. If voice commands are used, the usage of multiple microphones can be used to directionalize sounds and speech recognition can be used to segregate one human from another. In the context of the present invention, gestures can include movement of the arms, hands, face or other body parts.

Any type of gesture that can be performed by a human user can be defined and used in accordance with the present invention. In a preferred embodiment, the predefined set of gestures that are used to control the behavior of the interactive display system 200 are chosen to be as largely culture agnostic as possible. For example, a single hand wave over the head would be generally recognizable as a gesture for getting someone's attention. This gesture can intuitively be used by a user to get the system's attention. Similarly, a pointing gesture can be used to adjust a pointing location on the digital display 205 (for example to select an object), and an extended arm with palm facing out can be used to perform a stop command.

Figure 5:
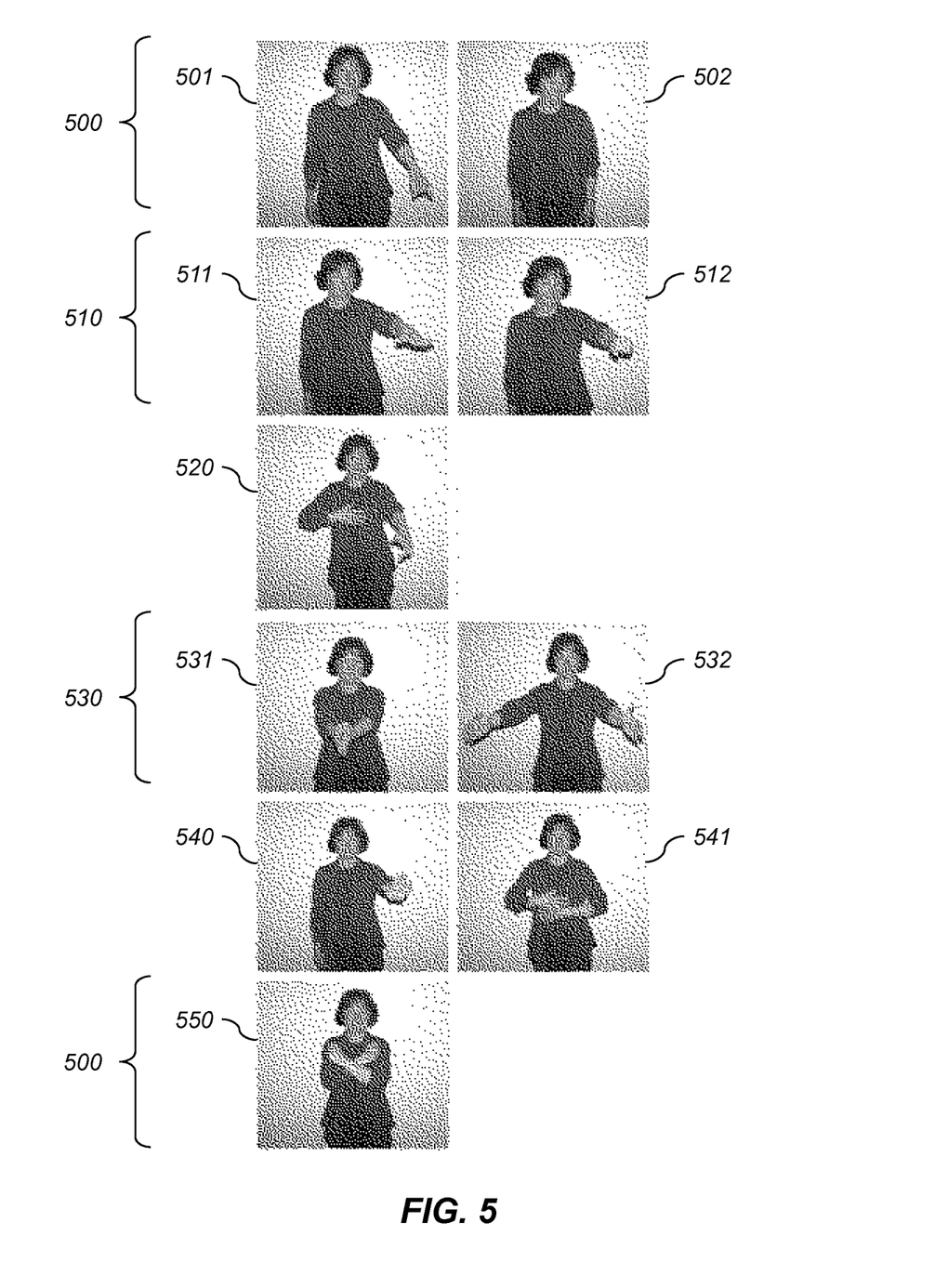
FIG. 5 illustrates examples of gestures that can be used to control the interactive display system.

FIG. 5 illustrates examples of a number of different gestures that can be used to control the interactive display system 200 (FIG. 2) in accordance with some embodiments of the present invention. These gestures can be easily modified or extended to suit any particular application, culture, or situation, suffice they can be described by the location of 3D joints or facial gestures over time. Application specific and vendor specific gestures are intended to be added above and beyond these basic gestures.

Pointing gestures 500 can be used to adjust a pointing location in the information display region 245 (FIG. 2). For pointing gesture 501 the pointing direction of the user's arm (or hand or finger) changes with time. As the pointing direction changes during the pointing gesture 501 the position of fiducial 260 (FIG. 2) is updated to reflect the location in the information display region 245 where the user is pointing. In some embodiments, the arm pointing direction is determined using the skeleton joint projection method discussed earlier, In some cases, when users wear loose or baggy clothing, or when they are carrying objects or a handbag, the accuracy that the skeleton joints can be determined is affected. As such, it is recommended that selectable objects on the screen be no smaller than ½₀ the width of the screen. For some applications it has been found that full arm extension pointing, rather than forearm pointing (elbow bent) or hand/finger pointing, is both more natural to the human user and also yields more accurate results.

In an alternate type of pointing gesture 502, the pointing direction is determined from the facial orientation or visual focus of attention (i.e., eye gaze) of the user. Empirical studies have shown that head pose gestures are more intuitive when users are in close proximity to the digital display 205 (FIG. 2), while arm pointing gestures are more intuitive for larger distances or larger displays. In some embodiments, both forms of pointing gestures can be supported. However, in applications that require selection and other more advanced gestures, the actor might get confused if she had to go back and forth between head and arm gestures. In that case, it is generally preferable to stick with only arm pointing gestures.

Because systems are subject to calibration/perspective errors, a fiducial should be placed on the screen, indicating where the human user is looking/pointing. In some embodiments, attributes of the fiducial indicate, the pointing location change depending on the pointing location, a state of the interactive display system 200, a characteristic of the controlling user or a gesture made by the controlling user. Examples of attributes of the fiducial that can be changed included the shape, color or size of the fiducial. For example, if the pointing location moves over a selectable active element the form of the fiducial can be changed accordingly (i.e., from a crosshair symbol for inactive regions of the digital display 205 to an arrow symbol for an active region corresponding to a clickable button). As discussed earlier, in some applications, the fiducial can be an avatar having characteristics that reflect attributes of the controlling user. In some embodiments, the fiducial can include a tail indicating a history of pointing locations.

A selecting gesture 510 can be used to select a selectable active element pointed to by the pointing location (analogous to a mouse click). For the selecting gesture 510, the user changes her hand from an open hand pointing position 511 to a closed fist pointing position 512, as if you were grabbing an object. An alternate selecting gesture 520 involves, borrowed from American Sign Language, involves pointing at an object with one hand while bringing the non-pointing hand to the chest, as if you were saying "I want that."

Zoom gestures can be used to zoom into or out of the information displayed in the information display region 245 (FIG. 2). Zoom gesture 530 shows an example of a zoom in gesture where the user moves her hands from a hands together position 531 to a hands apart position 532. The user can similarly perform a zoom out gesture by moving her hands from the hands apart position 532 to the hands together position 531. To stop a zoom action at the proper zoom factor, the user simply retracts her arms back to her body when she is satisfied with the zoom level.

Gestures can be defined to enable the user to stop (or pause) and continue various operations being performed by the interactive display system 200 (FIG. 2). An example of a stop gesture 540 involves the user holding out an arm with an open palm. A continue gesture 541 can be performed by the user rolling of her forearms.

A relinquish control gesture 550 can be performed by the user crossing her arms across her chest. When the user performs this gesture, the controlling user is moved to the end of the priority queue and the next user in the priority queue is designated to be the controlling user. To prevent unintentional relinquish control gestures 550 from irritating the controlling user, a hand raising gesture can be performed immediately after giving the cut gesture will reinstate the user's previous priority value. In some embodiments the relinquish control gesture 550 can also be used to perform a cut command.

In some embodiments, a control request gesture can be defined that enables a user that is not the controlling user to request that they be designated as a controlling user. For example, a hand raising gesture (not shown in FIG. 5) can be used for this purpose. This type of gesture is intuitively associated with trying to get someone's attention. In some embodiments, the user performing the control request gesture can immediately be designated to be a controlling user. In a preferred embodiment, the relative position of the user in the priority queue is adjusted in response to detection of a control request gesture. One mechanism for implementing this in the context of the priority value calculations described earlier is to add an additional term to the priority value equation:

$$P_i = W_D\left(1 - \frac{D_i}{D_m}\right) + W_T\left(\frac{T_i}{T_m}\right) + W_C C_i + W_A A_i \qquad (3)$$

where $A_i$ is number of attention getting gestures the user has performed, and $W_A$ is a weighting constant. By default, the $A_i$ value would be initialized to zero for each of the detected users. Each time the user performs a control request gesture, the $A_i$ value can be incremented by one, thereby increasing the associated priority value and consequently advancing their position in the priority queue. In some implementations, a minimum time interval between successive control request gestures can be defined in order to avoid disruptive behavior by a user.

In some embodiments, a plurality of different control request gestures can be defined indicating different levels of urgency. For example, a hand waving gesture can be defined which is more urgent than a hand raising gesture. If a hand waving gesture is detected, the $A_i$ value can be incremented using a larger increment (e.g., 2).

If a late-arriving user takes control away from the controlling user, this could be a source of irritation. In some embodiments, a mechanism can be provided to enable the original controlling user to conveniently regain control. For example, if the original controlling user performs a hand raising gesture within a predetermined time interval after being bumped to a lower priority then original controlling user can immediately be restored as the controlling user.

Figure 6:
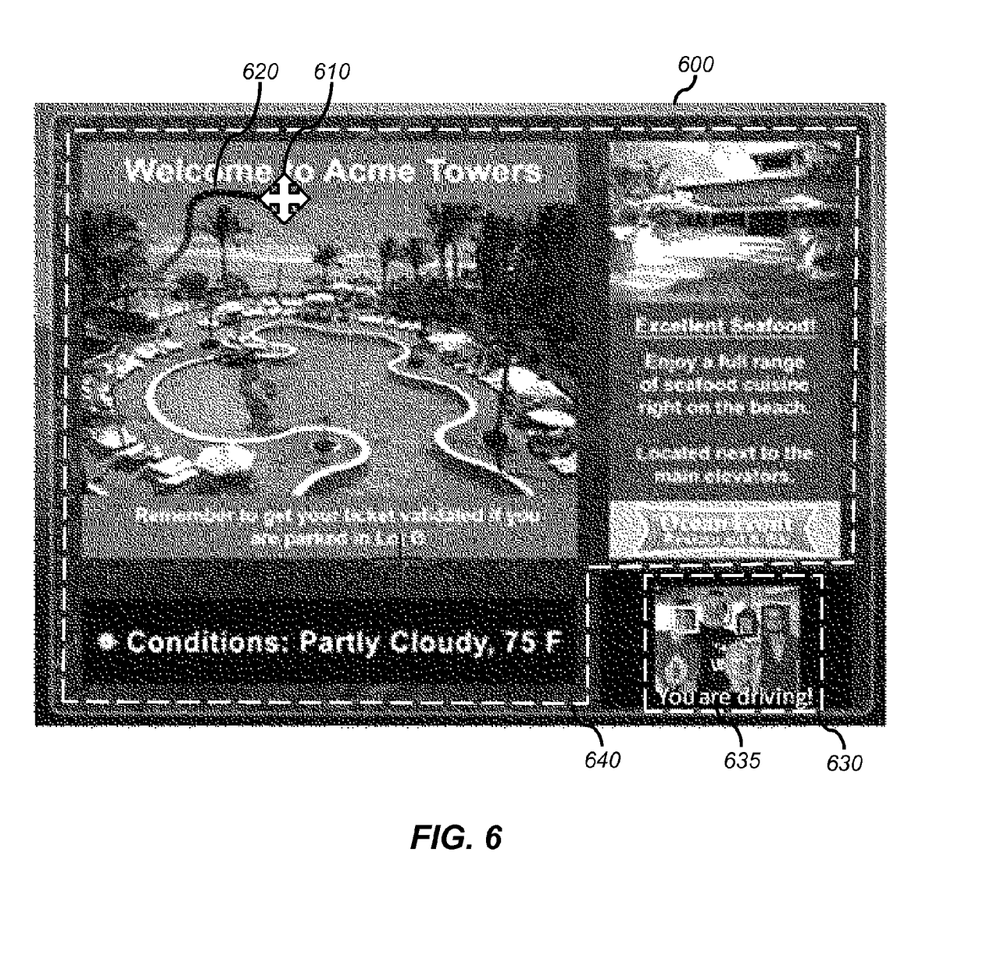
FIG. 6 shows an example of a digital display showing content for a digital signage application.

FIG. 6 shows an example of a digital display 600 implementing a digital signage application in accordance with the present invention. The digital display includes a command control region 630 and an information display region 640. The information display region 640 includes information pertaining to a tourist resort, including photographs, advertisements and various text messages providing useful information and reminders.

A time sequence of images captured using the digital camera 210 (FIG. 2) showing the users located in a field-of-view of digital display 600 is displayed in the command control region 630. Graphical elements (rectangular bounding boxes) are associated with each of the identified users, wherein the color of the graphical elements are used to differentiate the controlling user from the non-controlling users. A text message 635 is also included in the command control region 630 which provides a textual indication of the most recent command processed by the interactive display system 200 (FIG. 2). In this case, a "You are driving!" message having the same color as the bounding box for controlling user indicates that a different user has been identified to be the controlling user.

In this example, the controlling user is currently performing a pointing operation using a head pose pointing gesture. A cross hair fiducial 610 is overlaid on the digital display 600. A fiducial tail 620 trailing behind the fiducial 610 provides a visual indication of the path that the fiducial 610 has traversed. This helps some users focus more quickly on the fiducial mark. In this example, the color of the fiducial tail 620 fades from a first color (e.g., black) to a second color (e.g., gray) from the start to the end of the tail. In other embodiments, the fiducial tail can fade from opaque to transparent, or can be a constant color. The shape, size, color and transparency of the fiducial 610 and its fiducial tail 620 all affect the human user experience.

Although a cross-hair-shaped fiducial 610 is quite effective for many applications, fidicials can take any form such as a symbol, a character, a company logo or any graphical element of choice. To help give feedback to the human user, in some embodiments the fiducial 610 can change color, shape, icon, or be animated to give appropriate feedback during the interaction process responsive to the pointing location or the operation being performed. For example, when a user makes a correct selection, the fiducial 610 can be changed to a checkmark symbol, or when the interactive display system 200 is performing a processing operation, the fiducial 610 can be changed to an hour glass. Similarly, when a user cancels a selection, the fiducial 610 can change into an "x" symbol. If the user is performing a multistep process, the fiducial can incrementally change at each step. If a display allows multi-user interaction, each controlling user should have their own fiducial having a unique appearance that is somehow associated with the user (e.g., having a unique color or shape). In some embodiments, it may be desirable to enable each user to select their own personal fiducial marker, or design a personal avatar responsive to detected characteristics of the user.

The controlling user can interact with the content on the digital display 600 in various ways. For example, a selecting gesture 510 can be used to select a displayed object. If the selected object is a selectable active element, then an associated predefined action is performed. In other cases, the selected object can be manipulated in various ways after it is selected. In some embodiments, a selected object can be unselected by performing a second selecting gesture 510 to toggle the object selection. If a selected object is a draggable item, it can be moved around on the display using movement gestures. For example, movement gestures are defined where the user point an arm toward the object (or straight towards the digital display 600), then moves the arm in the direction that the user wants to move the object. Zoom gestures 530 can also be used zoom into or out of the selected item. Other gestures such as stop gestures 540, continue gestures 541 or relinquish control gestures 550 can also be used to interact with the system.

In some embodiments, facial pose tracking is used so that the system can know and understand what the user is looking at. In addition to using the facial pose information for various gestures as discussed earlier, it can also be used for other purposes. For example, if it is determined that the controlling user has not been looking at the display for a prolonged period of time, the system can skip to the next user in the priority queue (or the display can be reset when the system is operating in a single user mode).

In some embodiments, facial expression can be used to gauge the emotion of the actor. Neutral or happy emotions are indicative of user agreement or satisfaction. Surprise is indicative of amusement. Sad is a warning that content may not be appropriate. Depending on the application, angry emotions will have a different affect. For example, in a window shopping application, the detection of anger would trigger a change of content-perhaps a different style or color of clothing. However, in an airport terminal, airplane arrival status screens should generally be anger agnostic. As computer vision algorithms and hardware improve, it will one day be able to reliably read lips of the controlling user, making it possible to accept spoken commands even in noisy environments.

Facial identity can be used to both verify tracking over time, as well as remember user history and preferences. Should the same user return back to the same interactive display system, the interactive display system can recognize the user and act accordingly. For example, if an interactive display system is positioned at the entrance to a workplace, it can be used to greet users by name and provided customized informational messages as they enter work. In this case, the interactive display system can also be used to verify the user's identity, thereby acting as a security device. Similarly, digital ATMs and interactive gambling systems may use facial identity as a primary or secondary security feature. In some applications, user preferences might include a user's zip code for a weather oriented digital sign, previous purchases for a store front, or flight seat assignment preferences in an airport.

User attributes such as age, gender, and race can be collected for each user that interacts with the sign. As such, demographics can be collected for later targeted marketing. For example, a digital sign in front of a department store may have thousands of people interact with it each day. By interacting with users, the sign may offer various advertisements and provide easy ways for consumers to shop and compare or check inventory in the store. As part of the user interactions, coupon codes or other incentives to enter the store may be displayed. Statistics can be collected regarding how often particular types of displayed advertising content cause users in various demographic categories to enter the store. For example, it may be determined that middle aged Hispanic woman respond favorably to the new line of Gucci hand bags, and teenage African American boys have no interest in the new line of Levi's shirt-ware. Based on the collected data, data processing systems (e.g., "recommender systems"), such as those used as the underlying intelligence for shopping sites such as amazon.com or shared services such as Netflix movie section, are used for predicting user preferences. As new users are detected, people with similar interests or attributes are statistically coupled for an improved interaction experience. Further, an interest level database can be formed and updated providing an indication of the advertising effectiveness (e.g., as characterized by a determined user interest level) as a function of one or more demographic attributes. In some embodiments, the interest level database can be formed off-line and can be loaded into a storage memory in the interactive display system 200.

The advertising content displayed on the system can now be geared toward the demographics of users interacting with the system responsive to the interest level database and determined demographic attributes for the users (e.g., newly arriving Hispanic woman will be preferentially shown advertisements pertaining to the new line of Gucci bags). The controlling user can then interact with the displayed advertisement using appropriate gestures. For example, the controlling user can use a pointing gesture and a selection gesture to select a product in the displayed advertisement. Additional information pertaining to the selected product can then be provided, such information about available colors/sizes, and sale prices.

The content displayed by the system can also be tailored in other ways according to user demographics. For example, age attributes of the users can be used to control various system attributes such as the form of the fiducials, where children get cartoon-based fiducials, while adults get fiducials formed using company logos. Similarly, males and females would see gender appropriate apparel displayed.

Multiple display systems 200 in similar or dissimilar locales can be networked with one another for enhanced experiences. In this case, the display systems 200 will include some type of network interface such as a WiFi interface or an Ethernet interface. For example, the identity of users can be shared amongst multiple devices located in a mall, so a user who interacts with one display on the way in and another during her shopping visit is recognized by the second display. Similarly, demographic statistics can be shared across multiple systems making for more robust and pleasing recommender systems and targeted marketing scenarios in shorter durations of time. By networking multiple displays together, it is also possible for two or more users at different locales to link up with one another, sharing a similar application for informational sharing, personal entertainment, gaming, or multi-way video conversations.

The operation of prior art interactive digital signage applications can often be confusing in multi-user situations due to uncertainty about which user the system is responding to. In accordance with the present invention, the information displayed in the command control region 630, along with a few simple rules and gestures, solve these problems.

In order to enable natural two-way communication, it is important for users would like to know what the system is "thinking" The command control region 630 includes a live video stream of what the digital camera 210 (FIG. 2) is seeing. While FIG. 6 shows the command control region 630 positioned in the lower-right corner of the digital display 600, in various embodiments it can be placed anywhere where it minimally disrupts the signage content, but it should generally be positioned in an obvious location that is visible from all user viewpoints. The content displayed in the command control region 630 informs the user what the computer is seeing, answering common questions such as "Am I in the camera field of view?", "Is my head getting cut off?", "Does the computer recognize me?", and so on.

In FIG. 6, four human users are standing in front of the digital display 600. The command control region 630, shows those four users, providing a clear indication that the system sees all four users. The command control region 630 also includes graphical elements, (rectangular face boxes) associated with each of the users, confirming that all four users are being tracked by the system. The coloration of the graphical elements communicates to the users who the system is recognizing to be the controlling user. For example, the user that is currently in control of the system can be shown with a green rectangular face box, while the user that is next in priority queue can be shown with a yellow face box. The graphical elements for the rest of the users will gradually go from yellow to red, providing an indication of their relative position within the priority queue.

In some embodiments, to make the command control region 630 more informative, the detected head pose and facial expression can be reported back to the user via animated avatars. For example, the avatar faces can mimic the facial expressions, as well as the facial pose (pitch, roll, yaw) for the corresponding users. Each face can be replaced with an avatar, or small avatars can be placed next to each face. For example, "smiley face" avatars can be displayed next to each face box, where the actual expression and pose of the smiley face mimics that of the human user. In some applications, the avatars can be custom designed for a particular theme associated with the content or provider of the interactive display system (e.g., Mickey Mouse, Pillsbury Dough Boy, Harry Potter, or the Microsoft Paper Clip).

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 interactive display system
205 digital display
210 digital camera
220 field of view
231 user
232 user
240 command control region
245 information display region
250 image
251 user image
252 user image
260 fiducial
261 controlling user graphical element
262 secondary user graphical element
310 display images in command control region step
320 user detection/tracking step
330 users found test
340 determine controlling user(s) step
350 update command control region step
360 detect controlling user gesture step
370 gesture detected test
380 update information display region step
390 update command control region step
400 depth image
410 user
411 user
500 pointing gestures
501 pointing gesture
502 pointing gesture
510 selecting gesture
511 open hand pointing position
512 closed fist pointing position
520 selecting gesture 530 zoom gesture
531 hands together position
532 hands apart position
540 stop gesture
541 continue gesture
550 relinquish control gesture
600 digital display
610 fiducial
620 fiducial tail
630 command control region
635 text message
640 information display region

The invention claimed is:

1. An interactive digital advertising system, comprising:
a soft-copy display including at least an information display region and a command control region;
a digital image capture system positioned to capture a time sequence of images of users located in a field-of-view of the soft-copy display;
a data processing system;
a storage memory storing a library of advertisements; and
a program memory communicatively connected to the data processing system, wherein the program memory stores instructions configured to cause the data processing system to implement a method comprising the following steps:
displaying the captured time sequence of images in the command control region;
analyzing the captured time sequence of images to detect a plurality of users in the field-of-view of the soft-copy display who are viewing the soft copy display;
designating at least one of the detected plurality of users to be a controlling user;
responsive to designating the controlling user, updating the command control region to visually indicate the identity of the controlling user and to visually indicate a relative position of each of the detected plurality of users in a priority queue;
analyzing the captured time sequence of images to determine one or more demographic attributes relating to the at least one designated controlling user;
selecting a particular advertisement from the library of advertisements responsive to the determined demographic information;
displaying the selected advertisement in the information display region, wherein the advertisement comprises one or more selectable active elements;
detecting a pointing gesture and a selecting gesture made by the controlling user, wherein the pointing gesture and the selecting gesture correspond to the one or more selectable active elements; and
updating content displayed in the information display region in response to the detected pointing gesture and detected selecting gesture,
wherein the designation of the controlling user is determined responsive to a user's distance from the soft-copy display and a duration of time that a user has been viewing the soft-copy display, and wherein the designation of the controlling user includes determining a priority value determined by computing a weighted summation of two or more terms, wherein one of the terms is responsive to the normalized distance of the user from the soft-copy display and a second term is responsive to the normalized duration of time that the user has been viewing the soft-copy display.

2. The interactive digital advertising system of claim 1 wherein the content displayed in the information display region is updated to include a fiducial indicating a pointing location where the controlling user is pointing.

3. The interactive digital advertising system of claim 2 wherein the pointing gesture is an arm movement gesture or a hand movement gesture or a finger movement gesture.

4. The interactive digital advertising system of claim 2 wherein the fiducial includes a tail indicating a history of pointing locations.

5. The interactive digital advertising system of claim 1 wherein one or more selectable active elements are associated with predefined actions.

6. The interactive digital advertising system of claim 5 wherein the predefined actions are initiated in response to the pointing gesture and the selecting gesture.

7. The interactive digital advertising system of claim 1 wherein the method implemented by the processing system further comprises detecting a relinquish control gesture and designating a different detected user as the controlling user in response to the detected relinquish control gesture.

8. The interactive digital advertising system of claim 1 wherein the weighted summation also includes a term that increases the priority value for users that are currently designated to be a controlling user.

9. The interactive digital advertising system of claim 1 wherein the weighted summation also includes a term that increases the priority value for users who perform a control request gesture.

10. The interactive digital advertising system of claim 1 wherein graphical elements of distinctive color or shape visually indicate the relative position of each of the detected plurality of users in the priority queue.

11. The interactive digital advertising system of claim 10 wherein the graphical elements include geometrical shapes enclosing the faces of the detected users.

12. The interactive digital advertising system of claim 10 wherein the graphical elements include avatars placed in proximity to the faces of the detected users.

13. The interactive digital advertising system of claim 12 wherein one or more attributes of the avatars are adjusted responsive to one or more attributes of the detected users.

14. The interactive digital advertising system of claim 13 wherein a facial expression attribute, a facial orientation attribute, a visual focus of attention attribute, an age attribute, a gender attribute, a race attribute, a hair color attribute, a hair style attribute, a facial hair attribute, an eye glasses attribute, a height attribute, a weight attribute, an identifying object attribute, a complexion attribute, a jewelry attribute, a clothing attribute or a makeup attribute associated with the avatar are adjusted to in accordance with corresponding attributes of the detected users.

15. The interactive digital advertising system of claim 1 wherein the method implemented by the processing system further comprises detecting a control request gesture made by one of the detected users who is not the controlling user, and wherein the relative position of that user in the priority queue is adjusted in response to the detected control request gesture.

16. The interactive digital advertising system of claim 1 wherein the demographic information includes an age attribute, a gender attribute, a race attribute, a hair color attribute, a hair style attribute, a facial hair attribute, an eye glasses attribute, a height attribute, a weight attribute, an identifying object attribute, a complexion attribute, a jewelry attribute, a clothing attribute or a makeup attribute.

17. The interactive digital advertising system of claim 1 wherein the particular advertisement is selected responsive to an interest level database indicating an interest level for advertisements in the library of advertisements responsive to the demographic information.

18. The interactive digital advertising system of claim 17 further including:
   determining an interest level of the controlling user to the selected advertisement; and
   updating the interest level database responsive to the determined demographic information and the determined interest level of the controlling user.

19. The interactive digital advertising system of claim 1 further including a network interface for transmitting or receiving information from other interactive digital advertising systems or other data processing systems.

20. A method for controlling an interactive digital advertising system comprising a data processing system, a storage memory storing a library of advertisements, a soft-copy display including at least an information display region and a command control region, and a digital image capture system positioned to capture a time sequence of images of users located in a field-of-view of the soft-copy display, wherein the method comprises the following steps:
   the digital image capture system capturing a time sequence of images of the field-of-view;
   displaying the captured time sequence of images in the command control region;
   the data processing system analyzing the captured time sequence of images to detect a plurality of users in the field-of-view of the soft-copy display who are viewing the soft copy display;
   designating at least one of the detected plurality of users to be a controlling user;
   responsive to designating the controlling user, updating the command control region to visually indicate the identity of the controlling user and to visually indicate a relative position of each of the detected plurality of users in a priority queue;
   the data processing system analyzing the captured time sequence of images to determine demographic information relating to the at least one designated controlling user;
   selecting a particular advertisement from the library of advertisements responsive to the determined demographic information;
   displaying the selected advertisement in the information display region, wherein the advertisement comprises one or more selectable active elements;
   detecting a pointing gesture and a selecting gesture made by the one or more controlling users, wherein the pointing gesture and the selecting gesture correspond to the one or more selectable active elements; and
   updating content displayed in the information display region in response to the detected pointing gesture and detected selecting gesture,
   wherein the designation of the controlling user is determined responsive to a user's distance from the soft-copy display and a duration of time that a user has been viewing the soft-copy display, and wherein the designation of the controlling user includes determining a priority value determined by computing a weighted summation of two or more terms, wherein one of the terms is responsive to the normalized distance of the user from the soft-copy display and a second term is responsive to the normalized duration of time that the user has been viewing the soft-copy display.

21. The interactive digital advertising system of claim 1 wherein the normalized distance is normalized to a maximum distance across all currently detected users.

22. The interactive digital advertising system of claim 1 wherein the normalized duration of time is normalized to a maximum duration of time across all currently detected users.

23. The method of claim 20 wherein the normalized distance is normalized to a maximum distance across all currently detected users.

24. The method of claim 20 wherein the normalized duration of time is normalized to a maximum duration of time across all currently detected users.

* * * * *